March 21, 1950     C. ACKERMAN     2,500,973
SLICING MACHINE

Filed April 4, 1946     4 Sheets-Sheet 1

INVENTOR
CHARLES ACKERMAN
BY
ATTORNEY

March 21, 1950 C. ACKERMAN 2,500,973
SLICING MACHINE

Filed April 4, 1946 4 Sheets-Sheet 2

INVENTOR
CHARLES ACKERMAN
BY
ATTORNEY

March 21, 1950  C. ACKERMAN  2,500,973
SLICING MACHINE
Filed April 4, 1946  4 Sheets-Sheet 3
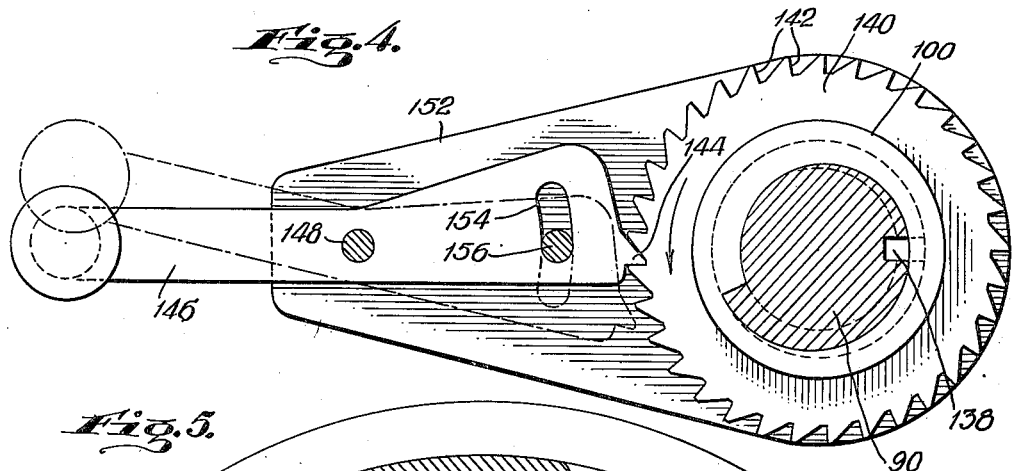
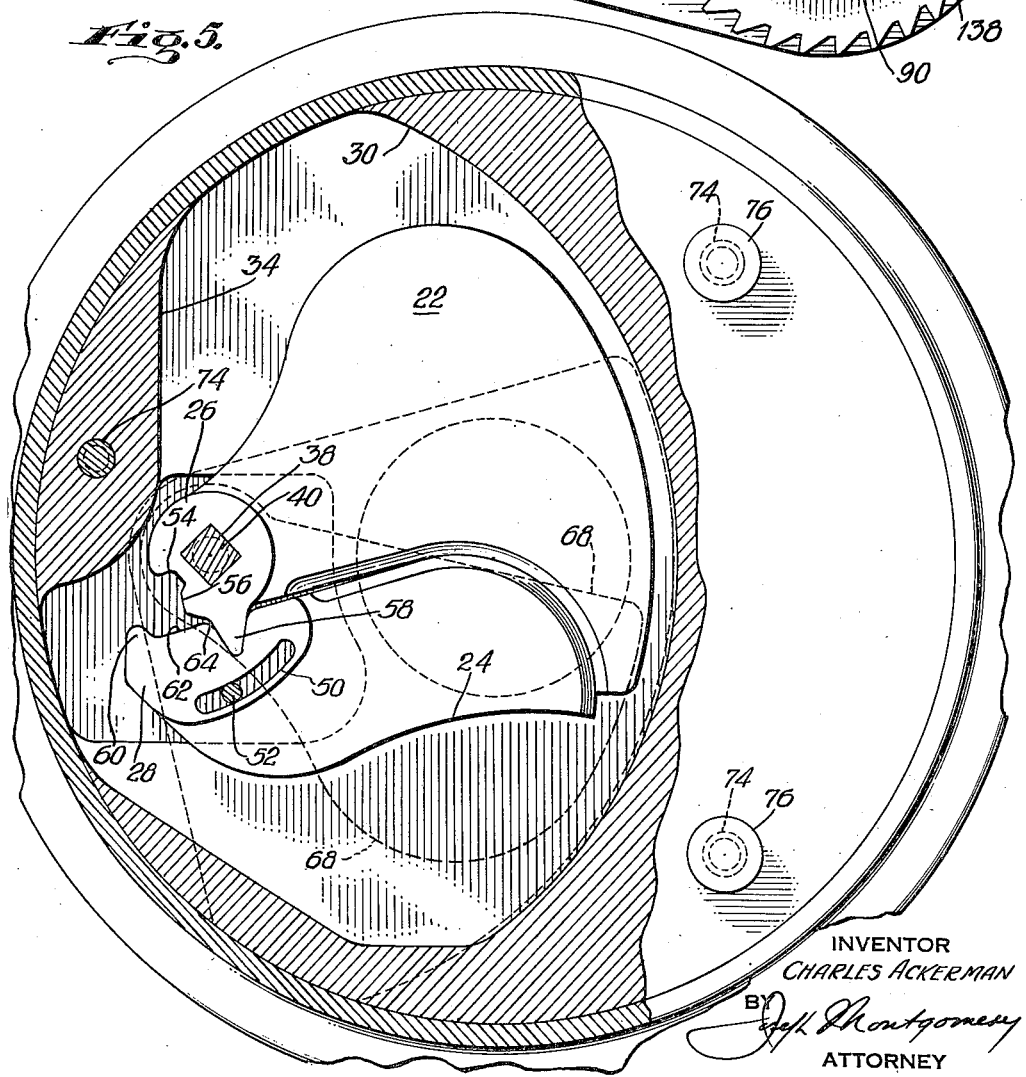
INVENTOR
CHARLES ACKERMAN
BY
ATTORNEY March 21, 1950 C. ACKERMAN 2,500,973
SLICING MACHINE
Filed April 4, 1946 4 Sheets-Sheet 4
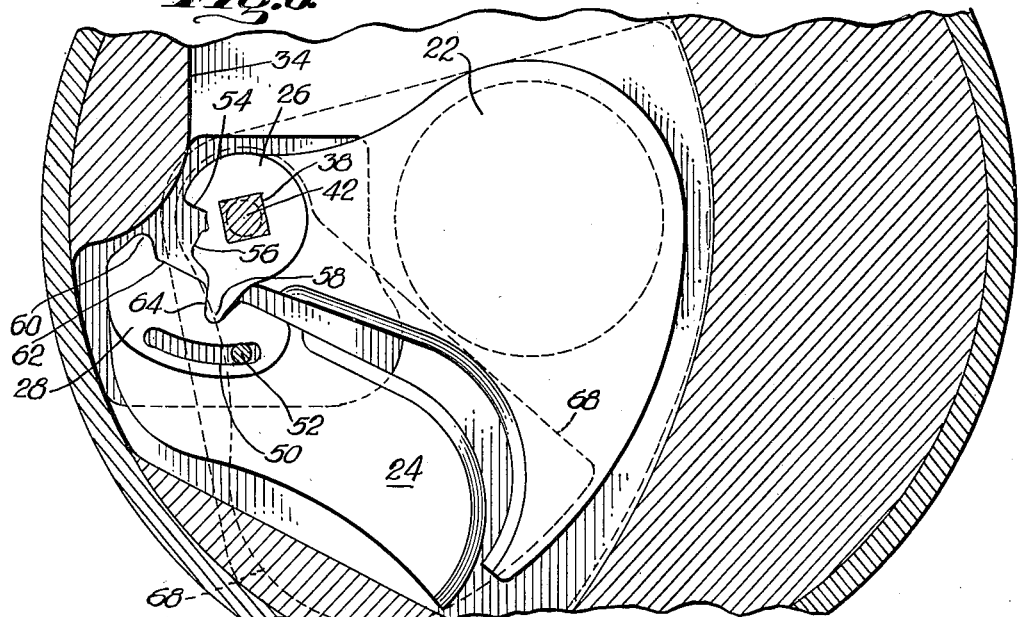
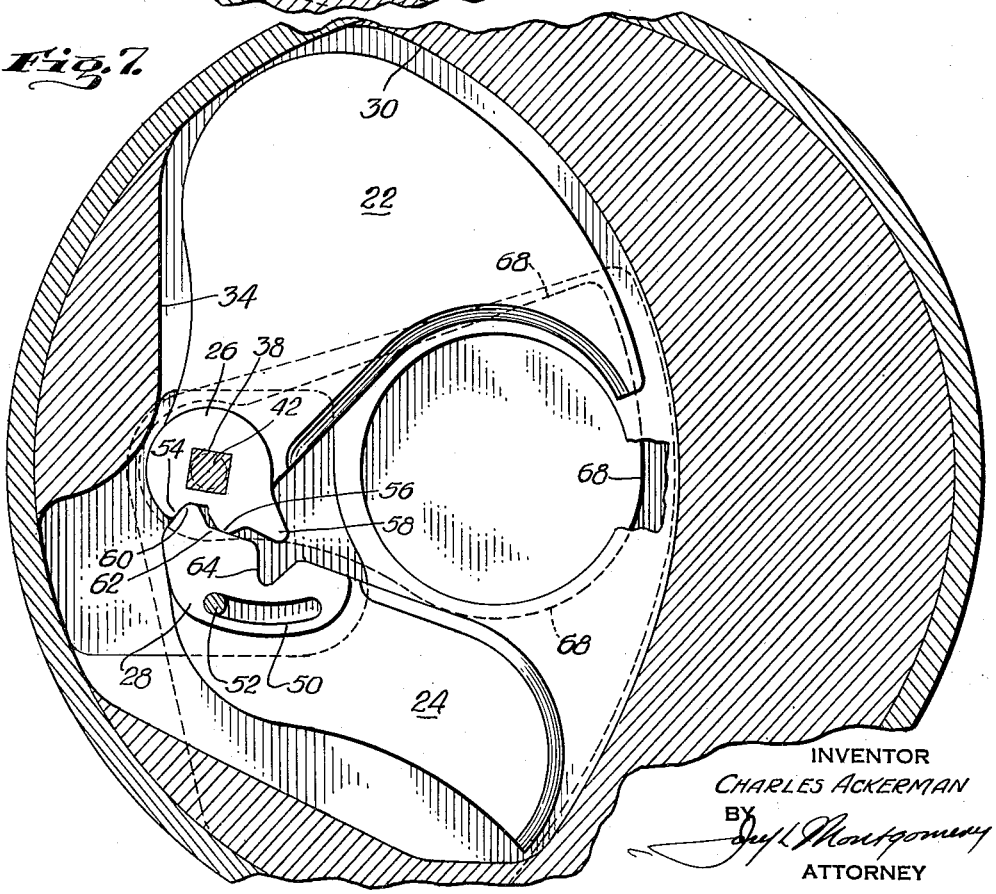
INVENTOR
CHARLES ACKERMAN
BY
ATTORNEY Patented Mar. 21, 1950

2,500,973

UNITED STATES PATENT OFFICE 2,500,973

SLICING MACHINE

Charles Ackerman, Hackensack, N. J.

Application April 4, 1946, Serial No. 659,513

17 Claims. (Cl. 17—32)

This invention relates to improvements in slicing machines and is particularly directed to a machine for producing slices such as patties or cakes from a mass of chopped or ground food such as hamburger meat or the like.

One of the objects of the present invention resides in the provision of an improved slicing machine for slicing patties or cakes from chopped or ground meat generally packed in cartons.

Another object resides in the provision of a machine of the character indicated for automatically packing or compressing a mass of loose chopped meat the same extent for each slicing operation to produce patties or cakes of the same weight.

A further object resides in the provision of means for accurately predetermining the pressure employed in the packing and feeding operations in machines of the character indicated and means for facilitating the placing of a fresh supply of chopped or ground meat in the machines.

A further object of the present invention resides in the provision of an improved slicing mechanism for slicing the mass of meat by cutting into opposite sides of the mass and completing the slicing operation in a region between the side faces of the mass, and means for supporting a partially cut slice at a point directly below the region in which the slicing is completed.

Still further objects reside in the provision of a machine of the character indicated wherein means are provided for supporting slicing blades and a closure gate against the pressure exerted by the packing means; means for readily dismounting and re-mounting of the slicing blades and closure gate for purposes of cleaning and repair; and means for advancing the packing means and restoring the pressure acting thereon as an incident to the operation of the slicing blades.

Still further objects of the present invention will be manifest from the following description and the accompanying drawing, in which:

Fig. 4 is a transverse horizontal sectional view on line 4—4 of Fig. 1;

Fig. 5 is a transverse horizontal sectional view on line 5—5 of Fig. 1 showing the slicing blades closed and the position of the bottom closure plate with reference to the bore in the cylinder;

Fig. 6 is a sectional view corresponding to that of Fig. 5 showing the position of the slicing blades and the closure plate at the end of a slicing operation; and Fig. 7 is a sectional view corresponding to that of Figs. 5 and 6 showing the slicing blades in open position and the closure plate in closed position, which are the positions of these members between slicing operations.

Figure 1:
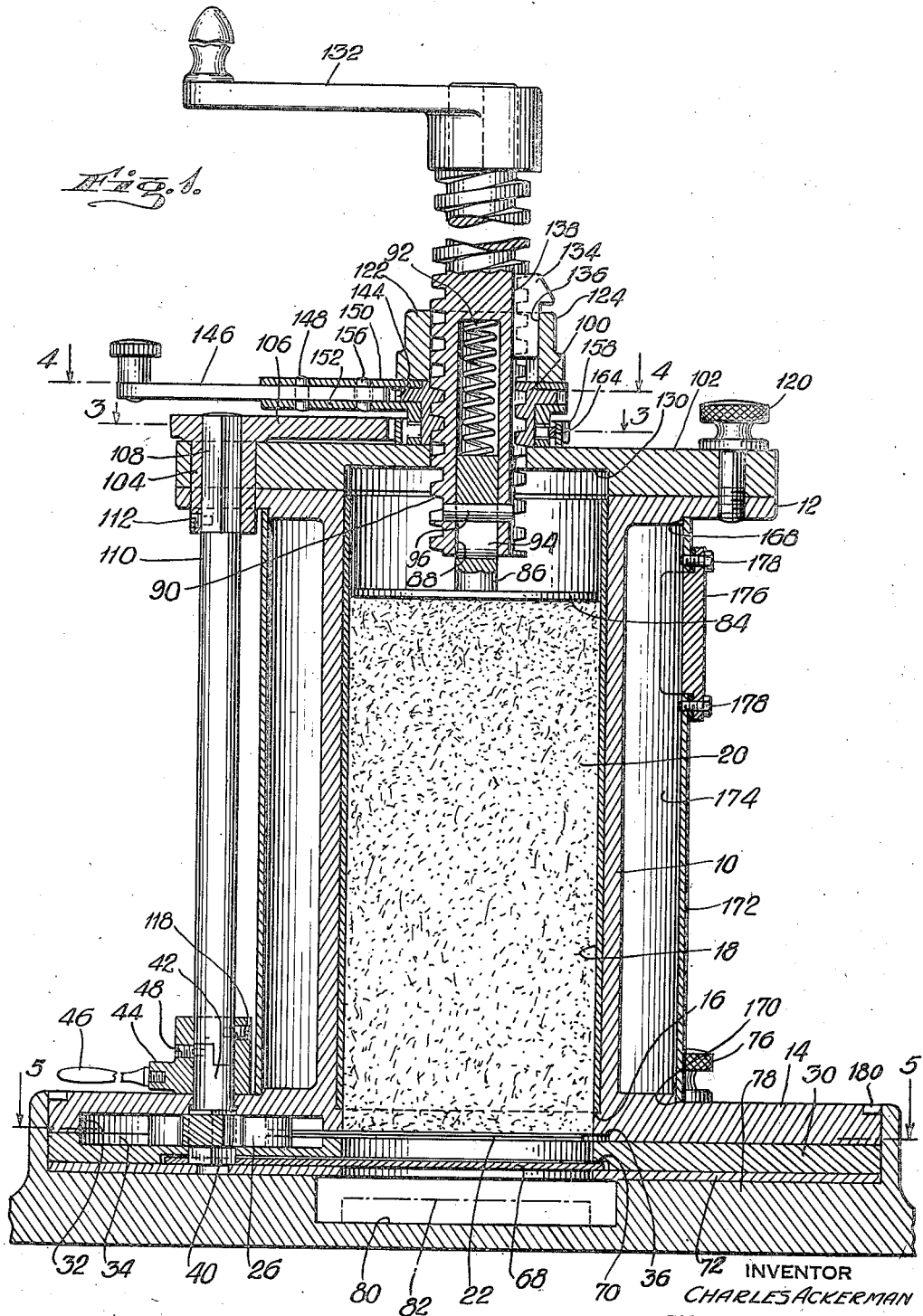
Fig. 1 is a vertical sectional view of the machine showing the parts in one position of adjustment and operation.

Referring to the drawings in detail the machine comprises a hollow cylinder 10 open at both ends and provided exteriorly at its upper and lower ends with annular flanges 12 and 14 respectively, the purpose of which will be apparent as the description proceeds. The cylinder adjacent the lower end may be provided with an interior edge or shoulder 16 constituting a seat for a carton 18 containing packed chopped food such as chopped hamburger meat 20. It will be obvious that loose chopped meat in bulk may be placed in the cylinder, without a carton and satisfactorily packed for slicing by plunger means hereinafter described.

The machine generally includes improved packing and feeding means with provision for controlling the initial pressure of the packing means and maintaining such pressure constant during the entire slicing operation with the result that all of the slices or patties cut off from one mass or roll of meat will be of substantially uniform weight and consistency. This part of the mechanism and its controlled operation by the mechanism for operating the slicing blades and bottom closure plate will be described presently.

In Figs. 5, 6 and 7 are shown complementary slicing blades 22 and 24 which are mounted to move in a common plane toward and away from each other and are preferably provided with double beveled cutting edges.

The main slicing blade 22 is provided with a hub 26 and the smaller complementary slicing blade 24 is provided with a hub 28, and as disclosed the blades project centrally from their hubs.

For the purpose of supporting the slicing blades which are subjected to the packing and feeding pressure and for the purpose of facilitating their removal for cleaning and repairing, an annulus 30, of the same interior and exterior radii as the lower end of the cylinder including the flange 14, is placed in face to face contact with the flange except in the regions of movement of the slicing blades. It is preferred to provide the contacting faces of the flange 14 and the annulus 30 with depressions 32 and 34, respectively, of the depth and outline shown to accommodate the hubs of the slicing blades and to provide the lower face of the flange 14 with a depression 36 of the depth and outline shown to accommodate the movement of the slicing blades. The blades can therefore bear and move on the upper plane face of the annulus 30 which can readily be machined and smoothed for this purpose. The slicing blade 22 is preferably of the configuration shown so that it may completely cover the outlet end of the cylinder at the end of the slicing stroke, as shown in Fig. 6. The length of the slicing blade 22 is such that its outer peripheral edge extends beyond the periphery of the adjacent wall of the cylinder and the edge of the opening in the annulus 30.

The hub 26 of the slicing blade 22 is provided with a square hole 38 fitting over the square lower end 40 of an operating shaft 42 journaled in the lower flange 14 of the cylinder, and projecting into hub 44 of an operating handle 46. The shaft may be secured to and supported from the hub by a set screw 48. The handle may be operated to swing the slicing blade 22 from and between the positions shown in Figs. 7 and 6.

The hub 28 of the smaller complementary blade 24 is provided with an arcuate slot 50 receiving a pin 52 mounted in the flange 14 about which the blade may slide and pivot under control of a driving connection between the hubs 26 and 28 which consists of a special form of interengagement teeth arrangement. The hub 26 is provided with a shoulder 54, a tooth 56 and a tooth 58 for cooperating respectively with a tooth 60, a flat surface 62 and a notch 64 in the hub 28. The construction and relation of the interengagement elements on the hubs is such that when the blade 22 is moved counterclockwise into the position shown in Fig. 7, the shoulder 54 on the hub 26 rotates the blade 24 clockwise with the rear end of the slot 50 pivoting on the pin 52. As the blade 22 is rotated clockwise at the beginning of a slicing operation, the tooth 56 on the hub 26 bears on the flat surface 62 on the hub 28 and initiates the counterclockwise pivoting movement of the blade 24, which is continued as the tooth 56 rides up on the tooth 60 and moves the notch 64 over the tooth 58 which then operates to further rotate the blade 24 and to move it inwardly and into the position shown in Fig. 5 which completes the actual slicing operation. Further clockwise movement of the shaft 42 will cause the blades 22 and 24 to rotate together clockwise and then move the blade 24 slightly away from the blade 22 at the end of the slicing stroke as shown in Fig. 6. Counterclockwise movement of the shaft 42 reverses the operation with the result that as the blade 22 is moved toward the position shown in Fig. 5, the blade 24 is moved under the end of the roll or mass of unsliced meat to support one side thereof as the blade 22 is rocked counterclockwise toward the position shown in Fig. 7.

The thickness of the slices produced is controlled by a gate 68 Figs. 1, 5, 6 and 7 which limits the downward movement of the roll or mass of material 20 when released for such movement by the slicing blades. The roll or mass of unsliced material is released by the blades 22 and 24 just before they are moved into the position shown in Fig. 7. The gate 68 operates in a depression 70 in the lower face of the annulus 30 in which it is supported by a similar annulus 72. The hub end of the gate 68 is provided with a square hole engaging over the square end 40 of the shaft 42 as shown in Fig. 1. The blade 22 and the gate 68 are so positioned on the shaft 42 that the rear edge of the gate is in substantial vertical alignment with the rearmost portion of the cutting edge on the blade 22. The closing gate 68 is in full position when the slicing blades release the mass of material to be fed against the gate.

In the position of the parts in Fig. 5, the slice is substantially completely severed while it is still supported on the closure gate. The slicing blades 22 and 24 move toward each other to effect the cutting and slicing thereby avoiding wear on the edge of the cylinder and its use as a cutting edge as in the case of a single slicing blade.

The annuli 30 and 72 are detachably secured to the flange 14 of the cylinder 10 by screw bolts 74 passing through holes in the flange 14 and annulus 30 and threaded into the annulus 72 and equipped with knurled heads 75. If desired these bolts may be threaded into a base to which is provided with an upstanding peripheral flange snugly receiving the flange 14 and annuli 30 and 72. The base is preferably provided with a radial depression or slideway 80 into which a skillet, tray or the like 82 may be slid and upon which the slices or patties are deposited as they are released by the gate 68.

The machine preferably includes mechanism for packing the mass of ground material and for advancing it downwardly between slicing operations. This mechanism includes a packing and feeding pressure backed plunger or piston 84 Fig. 1 operating within the cylinder 10. The piston 84 is provided with a stem 86 which operates in an axial bore 88 in a spindle 90 and is urged out of the bore by a spring 92 toward the position shown in this figure in which the upper end of a diametrical slot 94 in the stem engages a pin 96 in the spindle.

The spindle 90 is provided exteriorly with a long pitch power thread cooperating with threads in a nut like supporting collar 100 seated on a closure gate or plate 102 resting on the upper end of the cylinder and its upper flange 12 and pivotally mounted on said flange by means of a hollow hub 104 of a sector gear 106. The hollow hub 104 extends through holes in the gate 102 and flange 12 and is provided with a square axial hole to receive the square upper end 108 of a shaft 110 and to which the hub is secured by a set screw 112. The lower end of the shaft 110 interlockingly engages the upper end of the shaft 42 within the hub 44 of the operating handle 46, and is secured to the hub by means of a set screw 118. The gate 102 is held in the position shown by means of a threaded stud 120.

Figure 2:
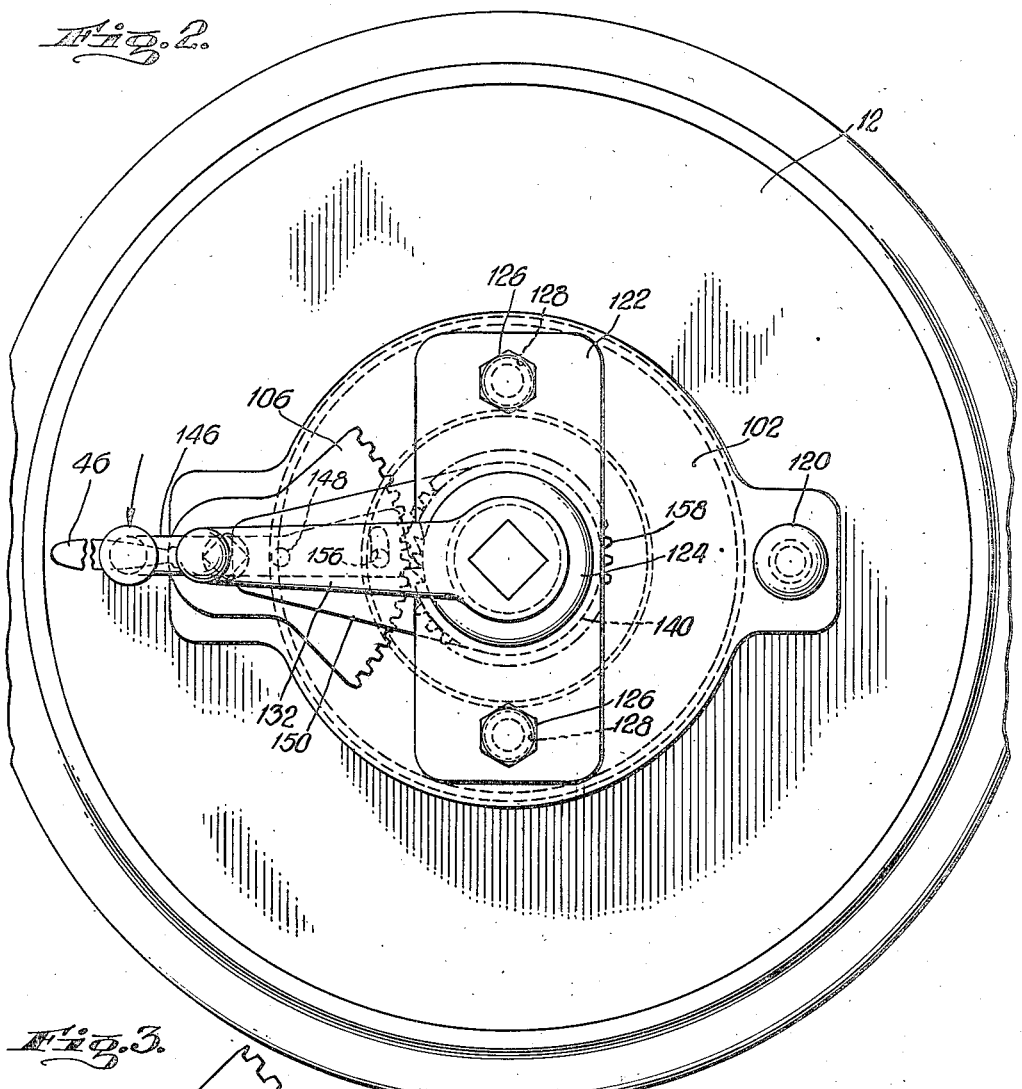
Fig. 2 is a top plan view of the machine.

The threaded collar 100 is held on the plate or gate 102 and confined against upward movement by the plate 122 providing an extended bearing as at 124 for the spindle 90. The plate 122 is secured to the gate 102 by stud bolts 126 passing through apertures in the plate 122 and spacer sleeves 128 and threaded into the gate 102 (Fig. 2).

The upper end of the spindle 90 is square for engagement by the hub of a crank handle 132 for rotating the spindle clockwise in the threaded collar 100 to lower and advance the plunger piston 84 against the mass of ground meat and to compress the spring 92 to the desired amount to produce the desired packing and feeding effect. By rotating the handle 132 counterclockwise the plunger piston may be moved into the recess 130 in the bottom face of the gate 102 clear of the upper end of the cylinder to permit the gate to be swung open.

Means is provided for effecting a fine adjustment of the spring 92 where this is found desirable and such means is especially desirable in a machine in which provision is made for locking the spindle against rotation and for advancing the spindle automatically during each slicing operation.

After the spindle 90 has been lowered as described, it may be locked against rotation by a removable key or coupling element 134 engaging a groove 136 in the plate 122 and extension 124 and a groove 138 extending lengthwise of the spindle 90.

For the purpose of lowering the spindle 90, the threaded collar 100 is provided with a flange 140, Fig. 4, equipped with ratchet teeth 142 adapted to be engaged by the ratchet tooth 144 on an operating lever or handle 146 pivoted at 148 on spaced plates 150 and 152 journaled on the collar 100. The handle 146 is slotted as at 154 to receive a limiting pin 156 secured in the plates 150 and 152. When the handle 146 is pivoted into the full line position, as shown in Fig. 4, its tooth 144 will engage the ratchet teeth 142 and upon counterclockwise movement of the handle the collar 100 will be rotated in a direction to lower the spindle 90 and increase the compression of the spring 92 and the packing effect of the plunger piston 84.

Figure 3:
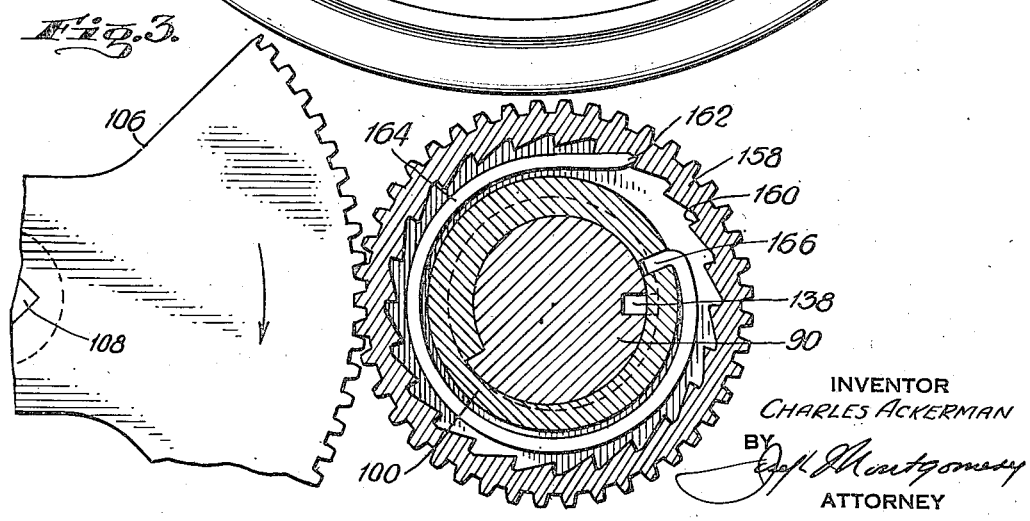
Fig. 3 is a transverse horizontal sectional view on line 3—3 of Fig. 1 looking in the direction of the arrows.

In order that the spindle 90 may be lowered automatically during each slicing operation by an amount equal to the thickness of a slice or patty so that the plunger piston 84 will produce the same packing effect prior to each slicing operation, provision is made for rotating the collar 100 counterclockwise during each forward or counterclockwise movement of the handle 46 and this is accomplished by means of the sector gear 106 connected to the upper end of the shaft 110 Fig. 1. In mesh with the sector gear 106 and surrounding the collar 100 is a gear 158, Fig. 3, provided interiorly with ratchet teeth 160 for engagement with the free pawl like outer end 162 of a spiral spring ratchet 164 which has its radially inturned inner end 166 extending into a slot in the collar 100. When the sector gear 106 is rocked clockwise with the clockwise slicing movement of the slicing blade 22, the collar 100 is rotated counterclockwise and lowers the spindle 90 thereby compressing the spring 92 and packing the ground mass of material in the cylinder so that it will be placed as it is advanced for the next slicing operation.

As shown in Fig. 1 the flanges 12 and 14 of the cylinder 10 may be provided with shoulders 168 and 170 for supporting a cylindrical casing 172 concentric with and in spaced relation to the cylinder 10 to provide a chamber 174 for a suitable refrigerant such as Dry Ice which may be introduced through an opening in the wall of the casing adapted to be closed by any suitable closure means such as a plate 176 secured to the casing by stud bolts 178.

When a fresh supply of ground meat is to be placed in the machine, the operator facing the front of the machine at the left side of Fig. 1, first rotates the handle 132 on the spindle in a counterclockwise direction to raise the piston or plunger 84 into the recess 130 in the lower face of the top cover or closure gate to clear the top of the cylinder as the gate is swung clockwise to uncover the upper end of the cylinder. It is assumed that the lowermost operating handle 46 is at its extreme right hand position and that the slicing blades and bottom closure gate are in the position shown in Fig. 7. The meat in bulk or packed in a carton is now placed in the cylinder after which the top cover or closure gate is swung counterclockwise to position the piston or plunger in alignment with the bore of the cylinder and then the closure gate is locked in this position.

The crank 132 on the upper end of the spindle 90 is now rotated clockwise until the piston or plunger 84 engages the meat and then it is rotated until the grooves 136 and 138 register to receive the key 134 which is then inserted. This may compress or pack the meat slightly. The handle 146 is then moved in the direction of the arrow, Fig. 2, to rotate the sleeve 100 which lowers the spindle and the piston or plunger to pack the meat to the extent desired. In certain cases this packing can be effected by rotating the spindle. If the meat is not packed in a carton it is preferable to use the handle 146 to do the packing. When the meat is in a carton it is generally packed to the proper degree so that the use of the handle 146 is not so necessary.

When the bottom handle 46 is operated to cut off a slice of the chopped meat, the sector gear engages the gear on the sleeve 100, threaded on the spindle, and moves the plunger downwardly. This packs the meat during the cutting or slicing operation and places the spring 92, which is within the end of the spindle, under compression.

When the handle 46 is moved back to its normal position, opening the slicing blades, the meat is forced down on the bottom closure plate or gate by means of the spring.

The device of the present invention is adapted to be placed on a counter in full view of customers and bears a sign reading "Not Touched by Hands." The entire machine, as shown in Fig. 1, except the base is inclosed in a casing or cover (not shown). This cover fits in an annular depression 180 in the upper face of the base flange 14. The operating handle 46 projects through a slot in the wall of the casing or cover, and is the only part that extends out of the cover, so that the customer, watching the operation, sees the attendant move the handle 46 and remove the skillet or tray 82 with the slice of chopped meat thereon.

While I have illustrated and described a preferred embodiment of my invention, it is to be understood that I do not wish to be limited to that precise construction and arrangement of parts, or the described operation of the same as obviously various changes and modifications may be made therein without departing from the spirit and scope of the invention.

What I claim is:

1. In a slicing machine, a container for material to be sliced having a feeding end and a discharge end including a resilient member, means for feeding the material toward the discharge end, a pair of slicing blades adjacent the discharge end, means for moving the blades from opposite sides of the container to slice the material, and to condition said resilient member to effect feeding of the material and means in alignment with the discharge end for receiving the sliced material.

2. In a slicing machine, a container for material to be sliced having a feeding end and a discharge end including a resilient member, means for feeding the material toward the discharge end, a pair of slicing blades adjacent the discharge end and having complementary cutting edges, means for moving the blades from opposite sides of the container whereby to bring the said edges into contact with each other to slice the material, and to condition said resilient member to effect feeding of the material and means in alignment with the discharge end for receiving the sliced material.

3. In a slicing machine, a cylinder for receiving material to be sliced, a flange on the discharge end of the cylinder, means for feeding the material toward the discharge end of the cylinder, an annulus in face to face contact with the outer face of said flange, the outer face of said flange being provided with a recess to receive a slicing blade, a slicing blade supported in said recess by said annulus, a second annulus in face to face contact with said first annulus, the outer face of said first annulus being provided with a recess to receive a closure gate, a closure gate supported in said latter recess by said second annulus, and an operating shaft journaled in said flange and having a detachable connection with said slicing blade and closure gate.

4. In a slicing machine, a cylinder for receiving material to be sliced, means for feeding said material toward the discharge end of said cylinder, slicing means supported in the discharge end of said cylinder for slicing the material and comprising a pair of complementary slicing blades mounted for movement toward each other to effect slicing and away from each other to permit the material to be fed between them, and means for moving said blades toward each and away from each other, to compress the material upon the movement of the blades toward each other and to condition the feeding means to feed the material upon movement of the blades away from each other.

5. In a slicing machine, a cylinder for receiving material to be sliced, means for feeding said material toward the discharge end of said cylinder, slicing means supported in the discharge end of said cylinder for slicing the material and comprising a pair of complementary slicing blades mounted for movement toward each other to effect slicing and away from each other to permit the material to be fed between them, means for moving said blades toward each other and away from each other, said latter means comprising an operating means for moving one of said blades and a driving connection between said blades for moving the other of said blades, and a driving connection between said operating means and said feeding means operable to actuate said feeding means to compress the material during the movement of the blades toward each other and to condition said feeding means to feed the material during the movement of the blades away from each other.

6. In a slicing machine, a cylinder for receiving material to be sliced, means for feeding said material toward the discharge end of said cylinder, slicing means supported adjacent the discharge end of said cylinder comprising a pair of pivoted complementary slicing blades, an operating shaft pivotally mounting one of said blades, pivot means for the other of said blades, and a driving connection between said blades for moving said other blade toward said one blade and then relatively lengthwise thereof during the slicing movement of said blades.

7. In a slicing machine, a cylinder for receiving material to be sliced, means for feeding said material toward the discharge end of said cylinder, a pair of slicing blades pivotally supported in the discharge end of said cylinder for movement toward and away from each other and for relative lengthwise movement as they approach each other, and means for operating said blades.

8. In a slicing machine, a cylinder for receiving material to be sliced, means for feeding said material toward the discharge end of said cylinder, a pair of slicing blades pivotally supported adjacent the discharge end of said cylinder for movement toward and away from each other, an operating shaft pivotally mounting one of said blades, a fixed pivot pin pivotally and slidably supporting the other of said blades, said latter blade being provided with a slot receiving said pin, and a driving connection between said blades including means for moving said latter blade toward the shaft operated blade during its forward movement and then relatively lengthwise in the direction of its pivot as it approaches said shaft operated blade to effect the slicing operation.

9. In a slicing machine, a cylinder for receiving material to be sliced, means for feeding said material toward the discharge end of said cylinder, a pair of slicing blades pivotally supported adjacent the discharge end of said cylinder for movement toward and away from each other, an operating shaft pivotally mounting one of said blades, a fixed pivot pin pivotally and slidably supporting the other of said blades, said latter blade being provided with a slot receiving said pin, and a driving connection between said blades including means for moving said latter blade toward the shaft operated blade during its forward movement and then relatively lengthwise in the direction of its pivot as it approaches said shaft operated blade to effect the slicing operation, said driving connection also including means for moving said latter blade with said shaft operated blade during the continued forward movement thereof.

10. In a slicing machine, a cylinder for receiving material to be sliced, means for feeding said material toward the discharge end of said cylinder, a pair of slicing blades pivotally supported in the discharge end of said cylinder for movement toward and away from each other, an operating shaft pivotally mounting one of said blades, a fixed pivot pin pivotally and slidably supporting the other of said blades, said latter blade being provided with a slot receiving said pin, and a driving connection between said blades including means for moving said latter blade toward the shaft operated blade during its forward movement and then relatively lengthwise in the direction of its pivot as it approaches said shaft operated blade to effect the slicing operation, said driving connection also including means for moving said latter blade with said shaft operated blade during the continued forward movement thereof and said driving connection also including means for moving said latter blade with said shaft operated blade into said discharge end of the cylinder and then by return movement out of the discharge end of the cylinder as said shaft operated blade is moved out of the discharge end of the cylinder.

11. In a dispensing machine, a cylinder for receiving material to be sliced, a normally closed gate at the discharge end of said cylinder, a pair of normally withdrawn slicing blades mounted for movement toward and away from each other, the cutting edge of one of said blades being aligned with the trailing edge of said gate, and means for moving said blades toward each other to effect slicing and for moving said gate into position to dispense the slice produced.

12. In a slicing machine, a cylinder adapted to receive material to be sliced, a gate and slicing means in the discharge end of said cylinder, operating means therefor, a plunger within said cylinder bearing on said material, a threaded spindle slidably mounted on said cylinder, a sliding supporting connection between said plunger and spindle, a spring interposed between said plunger and spindle, and means actuated by said operating means for advancing said spindle during each operation of said operating means.

13. In a slicing machine, a cylinder adapted to receive material to be sliced, a gate and slicing means at the discharge end of said cylinder, operating means therefor, a threaded spindle supported slidably and rotatingly coaxially of the cylinder in the intake end thereof, a feeding plunger slidably supported on said spindle, spring means urging said plunger toward the discharge end of said cylinder, nut means rotatably supported on said cylinder and cooperating with said spindle, manipulative means for rotating said spindle to advance said plunger, means for holding said spindle against rotation and manipulative means for rotating said nut means for advancing said spindle to adjust said spring means, and means actuated by said operating means for rotating said nut means to readjust said spring means during each slicing operation.

14. In a slicing machine, a cylinder adapted to receive ground material to be packed and sliced, a closure gate and slicing means in the discharge end of said cylinder, material packing means comprising a plunger adapted to bear on the material, a threaded spindle rotatably and slidably supported on the intake end of said cylinder and slidably supporting said plunger, spring means urging said plunger away from said spindle, nut means rotatably supported on said cylinder and cooperating with said spindle, means for rotating said spindle through said nut means to effect an approximate adjustment of said spring means and the position of said plunger, and means for rotating said nut means to effect a fine adjustment of said spring means to pack said material the desired extent.

15. In a slicing machine, a cylinder adapted to receive ground material to be packed and sliced, a closure gate and slicing means in the discharge end of said cylinder, material packing means comprising a plunger adapted to bear on the material, a threaded spindle rotatably and slidably supported on the intake end of said cylinder and slidably supporting said plunger, spring means urging said plunger away from said spindle, nut means rotatably supported on said cylinder and cooperating with said spindle, means for rotating said spindle through said nut means to effect an approximate adjustment of said spring means and the position of said plunger, means for rotating said means to effect a fine adjustment of said spring means to pack said material the desired extent, and means for readjusting said spring means during each slicing operation.

16. In a slicing machine, a cylinder adapted to receive material to be sliced, a closure gate and slicing means mounted in the discharge end of said cylinder, an operating shaft therefor, a flange on the intake end of said cylinder, a cover plate resting on said flange, said flange and cover plate having aligned pivot holes, a threaded spindle slidably supported in said cover plate, manipulative means for adjusting the spindle axially, a material packing plunger slidably supported in said spindle, spring means urging said plunger away from said spindle to pack said material, rotatable nut means cooperating with said spindle and equipped with gear means, a sector gear adapted to cooperate with said gear means to advance said spindle during each operation of the machine a distance equal to the thickness of a slice produced, a hub on said sector extending through said pivot holes, and a shaft connecting said hub and operating shaft.

17. In a dispensing machine, a container for material to be dispensed having a feeding end and a discharge end, means for feeding the material through said container, a pair of slicing blades adjacent the discharge end of the container, means for actuating the said blades to move them in opposite directions toward each other whereby to slice the material, means for supporting the material during the slicing operation, means for actuating said supporting means to move the same out of alignment with the container after the slicing operation to dispense the sliced portion of the material, and manually operable means for simultaneously operating the material feeding means, the blade actuating means and the actuating means for the supporting means.

CHARLES ACKERMAN.

REFERENCES CITED

The following references are of record in the file of this patent:

UNITED STATES PATENTS

| Number | Name | Date |
| --- | --- | --- |
| 582,689 | Riehl | May 18, 1897 |
| 1,273,227 | Hren | July 23, 1918 |
| 2,021,794 | Leone | Nov. 19, 1935 |
| 2,101,755 | Rosenstone et al. | Dec. 7, 1937 |
| 2,150,659 | Santo | Mar. 14, 1939 |
| 2,187,511 | Baxter | Jan. 16, 1940 |